US012634224B2

(12) United States Patent (10) Patent No.: US 12,634,224 B2
Eswaran et al. (45) Date of Patent: May 19, 2026

(54) COFLOWS FOR GEO-DISTRIBUTED COMPUTER SITES THAT COMMUNICATE VIA WIDE AREA NETWORK

(71) Applicant: INTERNATIONAL BUSINESS MACHINES CORPORATION, Armonk, NY (US)

(72) Inventors: Anand Eswaran, Bengaluru (IN); Mudit Verma, New Delhi (IN); Aishwariya Chakraborty, Yorktown Heights, NY (US); Praveen Jayachandran, Bangalore (IN); Pankaj Thorat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 18/489,818

(22) Filed: Oct. 18, 2023

(65) Prior Publication Data

US 2025/0133007 A1 Apr. 24, 2025

(51) Int. Cl.
*H04L 45/12* (2022.01)
*H04L 45/125* (2022.01)
*H04L 47/625* (2022.01)

(52) U.S. Cl.
CPC .......... *H04L 45/126* (2013.01); *H04L 45/125* (2013.01); *H04L 47/6265* (2013.01)

(58) Field of Classification Search
CPC ................................ H04L 45/22; H04L 45/24
See application file for complete search history.

(56) References Cited

U.S. PATENT DOCUMENTS

| | | | | |
|---|---|---|---|---|
| 8,787,154 B1 * | 7/2014 | Medved | .................. | H04L 45/12 |
| | | | | 370/225 |
| 10,749,812 B2 | 8/2020 | Fu | | |
| 2012/0182865 A1 * | 7/2012 | Andersen | .................. | H04L 1/22 |
| | | | | 370/228 |
| 2019/0268421 A1 * | 8/2019 | Markuze | ................. | H04L 67/10 |

FOREIGN PATENT DOCUMENTS

| | | |
|---|---|---|
| CN | 111966513 A | 11/2020 |
| CN | 112468414 A | 3/2021 |
| CN | 110166372 B | 4/2022 |

OTHER PUBLICATIONS

Chowdhury et al., "Efficient Coflow Scheduling with Varys", SIGCOMM '14: Proceedings of the 2014 ACM conference on SIGCOMM, Aug. 17, 2014, pp. 443-454.

(Continued)

*Primary Examiner* — Caroline H Jahnige
(74) *Attorney, Agent, or Firm* — CHIP LAW GROUP

(57) ABSTRACT

A coflow is mapped to a plurality of geo-distributed computer sites that can communicate via wide area network (WAN), where the mapping is subject to one or more location-dependent constraints. Multiple candidate data paths are identified for each of a plurality of source-destination pairs of the plurality of geo-distributed computer sites. A mathematical optimization is performed to find a set of paths from the candidate data paths based on total flow completion time and at least one additional objective of the coflow.

17 Claims, 9 Drawing Sheets

(56) References Cited

OTHER PUBLICATIONS

Chowdhury et al., "Efficient Coflow Scheduling Without Prior Knowledge", SIGCOMM '15: Proceedings of the 2015 ACM Conference on Special Interest Group on Data Communication, Aug. 17, 2015, pp. 393-406.
Liu et al., "Siphon: Expediting Inter-Datacenter Coflows in Wide-Area Data Analytics", USENIX ATC '18: Proceedings of the 2018 USENIX Conference on Usenix Annual Technical Conference, Jul. 11, 2018, pp. 507-518.
Zhao et al., "Rapier: Integrating Routing and Scheduling for Coflow-aware Data Center Networks", 2015 IEEE Conference on Computer Communications (Infocom), Aug. 2015, 9 pages.

* cited by examiner

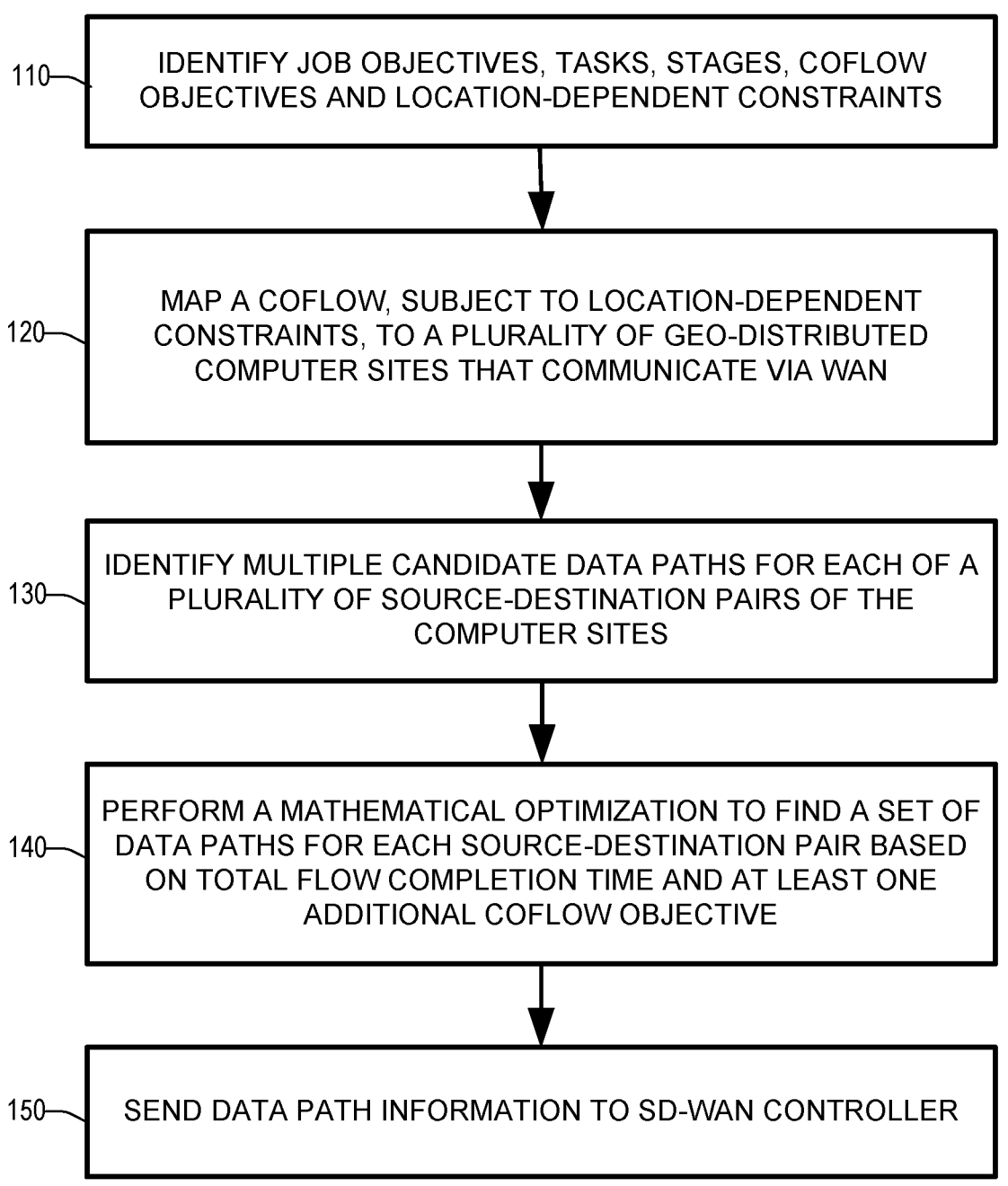

110 — IDENTIFY JOB OBJECTIVES, TASKS, STAGES, COFLOW OBJECTIVES AND LOCATION-DEPENDENT CONSTRAINTS

120 — MAP A COFLOW, SUBJECT TO LOCATION-DEPENDENT CONSTRAINTS, TO A PLURALITY OF GEO-DISTRIBUTED COMPUTER SITES THAT COMMUNICATE VIA WAN

130 — IDENTIFY MULTIPLE CANDIDATE DATA PATHS FOR EACH OF A PLURALITY OF SOURCE-DESTINATION PAIRS OF THE COMPUTER SITES

140 — PERFORM A MATHEMATICAL OPTIMIZATION TO FIND A SET OF DATA PATHS FOR EACH SOURCE-DESTINATION PAIR BASED ON TOTAL FLOW COMPLETION TIME AND AT LEAST ONE ADDITIONAL COFLOW OBJECTIVE

150 — SEND DATA PATH INFORMATION TO SD-WAN CONTROLLER

FIG. 1

410 — DETERMINE A PROPORTION OF TASKS AT EACH COMPUTER SITE THAT DOES NOT VIOLATE ANY LOCATION-DEPENDENT CONSTRAINTS

420 — QUANTIZE THE PROPORTIONS BELOW CERTAIN THRESHOLDS WHILE KEEPING THE CHANGE IN COPY TIME WITHIN A TOLERANCE

430 — SCALE THE PROPORTIONS TO DETERMINE A NUMBER OF TASKS AT EACH COMPUTER SITE

440 — OPTIONALLY PERFORM RANGE PARTITIONING

510 — PICK MULTIPLE CANDIDATE DATA PATHS FOR EACH SOURCE-DESTINATION PAIR

520 — FORMULATE AN OBJECTIVE FUNCTION BASED ON JOB COMPLETION TIME AND AT LEAST ONE OTHER OBJECTIVE FOR THE SET OF CANDIDATE PATHS FOR ALL SOURCE-DESTINATION PAIRS

530 — PERFORM MINIMIZATION OF THE OBJECTIVE FUNCTION TO YIELD THE SET OF PATHS

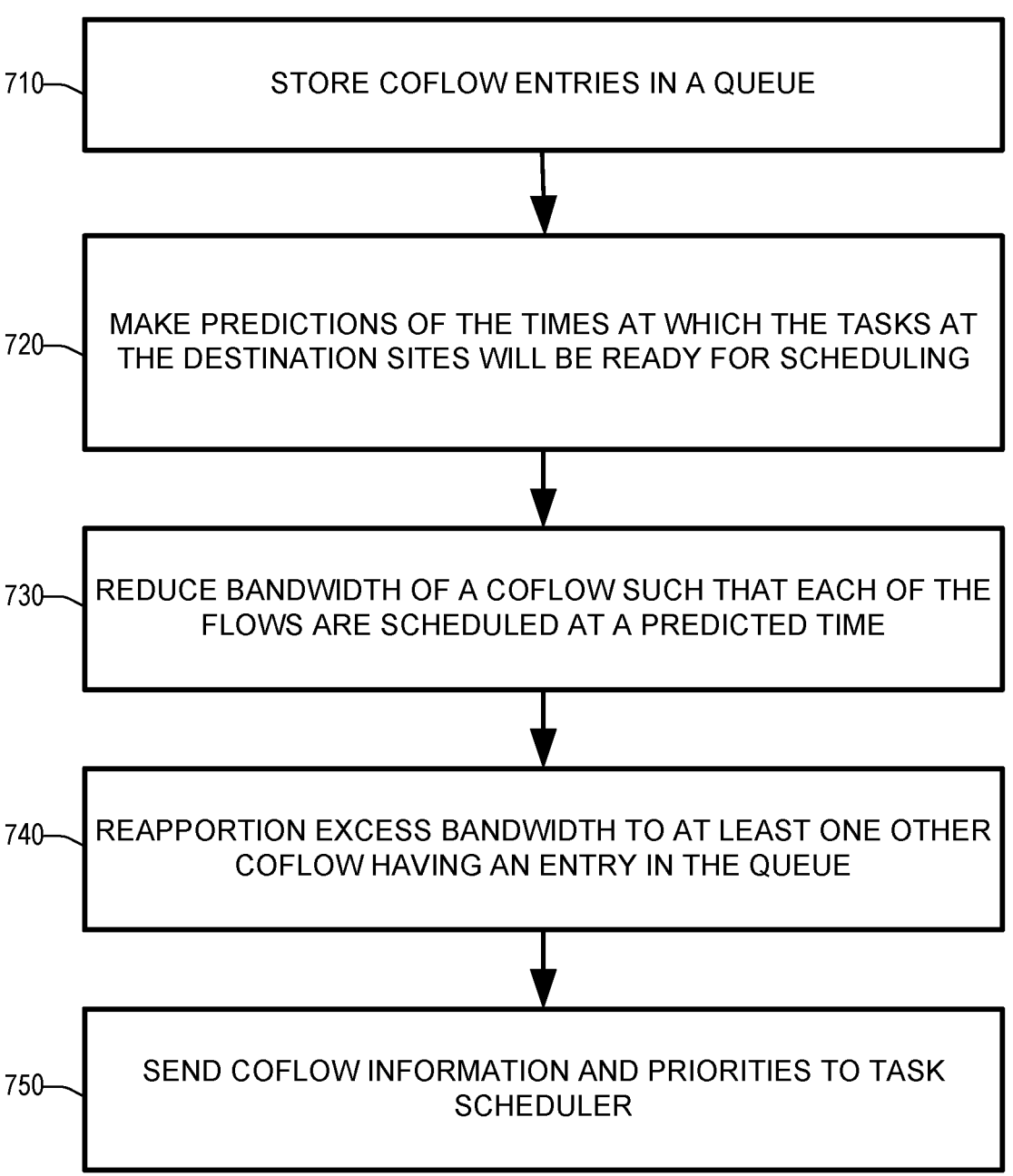

710 — STORE COFLOW ENTRIES IN A QUEUE

720 — MAKE PREDICTIONS OF THE TIMES AT WHICH THE TASKS AT THE DESTINATION SITES WILL BE READY FOR SCHEDULING

730 — REDUCE BANDWIDTH OF A COFLOW SUCH THAT EACH OF THE FLOWS ARE SCHEDULED AT A PREDICTED TIME

740 — REAPPORTION EXCESS BANDWIDTH TO AT LEAST ONE OTHER COFLOW HAVING AN ENTRY IN THE QUEUE

750 — SEND COFLOW INFORMATION AND PRIORITIES TO TASK SCHEDULER

Figure 8:
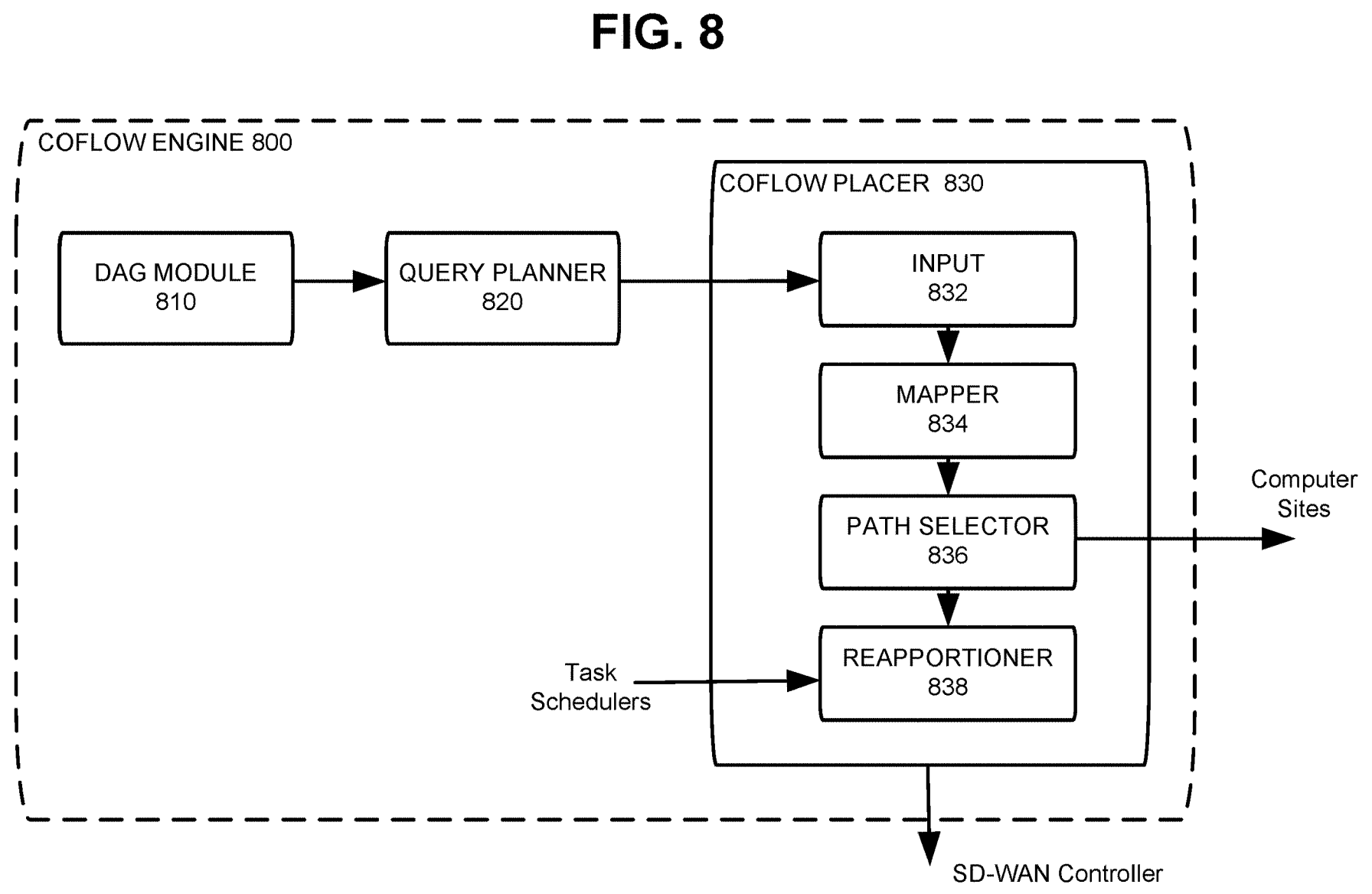

COFLOW ENGINE 800

DAG MODULE 810

QUERY PLANNER 820

COFLOW PLACER 830

INPUT 832

MAPPER 834

PATH SELECTOR 836

REAPPORTIONER 838

Computer Sites

SD-WAN Controller

Task Schedulers

900

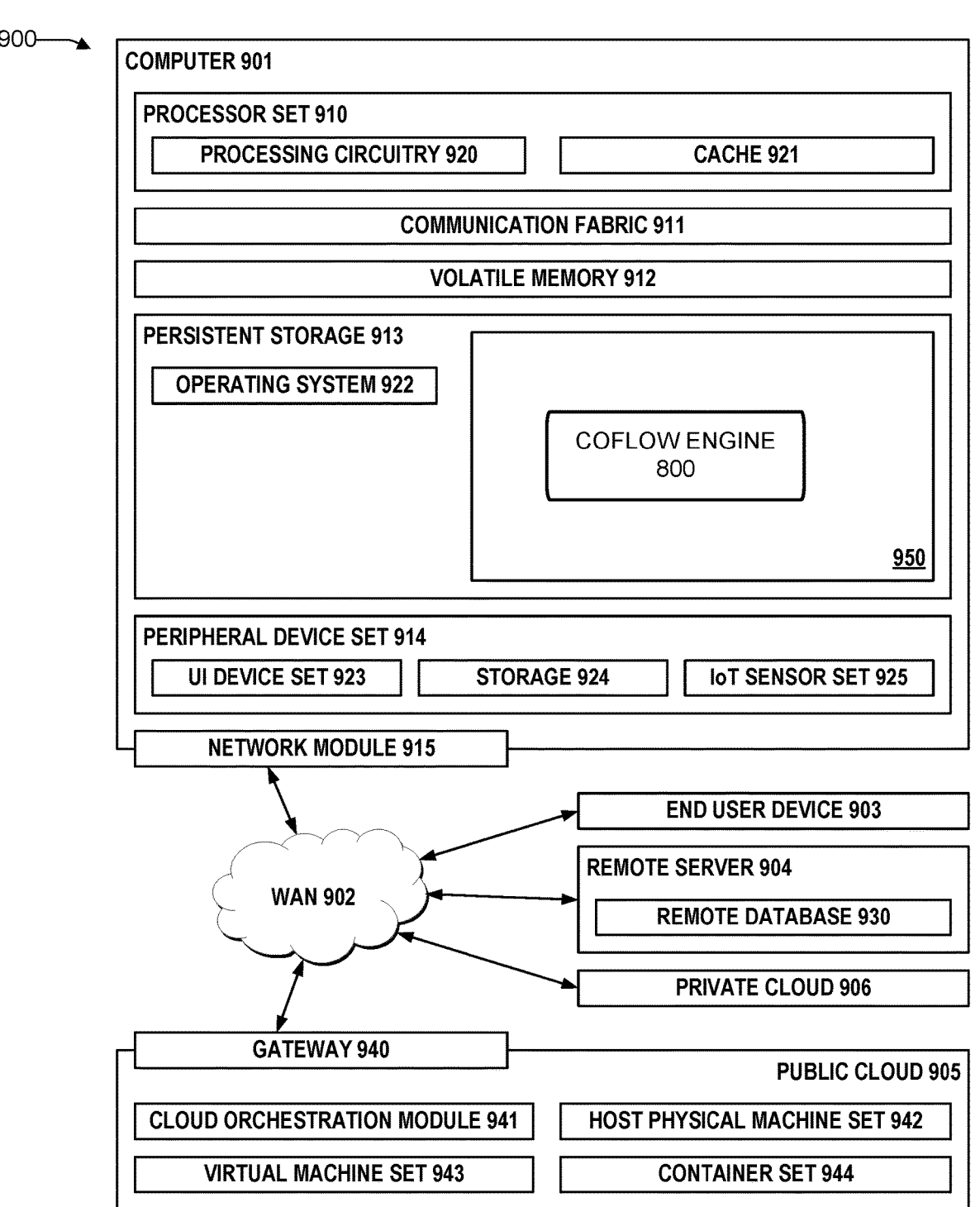

COMPUTER 901

PROCESSOR SET 910

PROCESSING CIRCUITRY 920    CACHE 921

COMMUNICATION FABRIC 911

VOLATILE MEMORY 912

PERSISTENT STORAGE 913

OPERATING SYSTEM 922

COFLOW ENGINE 800

950

PERIPHERAL DEVICE SET 914

UI DEVICE SET 923    STORAGE 924    IoT SENSOR SET 925

NETWORK MODULE 915

WAN 902

END USER DEVICE 903

REMOTE SERVER 904

REMOTE DATABASE 930

PRIVATE CLOUD 906

GATEWAY 940

PUBLIC CLOUD 905

CLOUD ORCHESTRATION MODULE 941    HOST PHYSICAL MACHINE SET 942

VIRTUAL MACHINE SET 943    CONTAINER SET 944

FIG. 9

COFLOWS FOR GEO-DISTRIBUTED COMPUTER SITES THAT COMMUNICATE VIA WIDE AREA NETWORK

BACKGROUND

Technical Field

The present disclosure generally relates to computer networks, and more particularly, to geo-distributed computer sites that communicate via wide area network.

Description of the Related Art

Data-intensive applications in a data center may generate a large number of parallel data streams. Communication is structured and takes place between groups of machines in successive computation stages. Often a computation stage cannot finish until all its flows have completed.

Coflows have been proposed as a way to transmit application layer semantics to a network layer. A coflow may refer to a set of flows with a common objective. The coflow includes information about its structure and the common objective of its flows, including special communication patterns (e.g., a shuffle). The information provided by coflows can be used at a network layer to improve task scheduling and allocation of network bandwidth for a large number of parallel data streams in a data center.

SUMMARY

According to various embodiments, a computing device, a non-transitory computer readable storage medium, and a method are provided. A coflow is mapped to a plurality of geo-distributed computer sites that can communicate via wide area network (WAN), where the mapping is subject to one or more location-dependent constraints. Multiple candidate data paths are identified for each of a plurality of source-destination pairs of the plurality of geo-distributed computer sites. A mathematical optimization is performed to find a set of paths from the candidate data paths based on total flow completion time and at least one additional objective of the coflow.

In some embodiments, a dependency graph structure is accessed. The dependency graph structure describes geo-distributed job objectives and data sources, inter-operator data volumes, and the location-dependent constraints. The at least one additional objective of the coflow is derived from the geo-distributed job objectives. A number of computer sites for a given stage is estimated subject to the one or more location-dependent constraints. The mapping includes placing tasks at the number of computer sites.

In some embodiments, the mapping includes performing a mathematical optimization of an objective function based on a proportion of tasks, upload bandwidth, download bandwidth, and data volume for each of the number of computer sites. The mapping further includes quantizing each proportion, and scaling each quantized proportion to produce an actual number of tasks at each of the number of computer sites.

In some embodiments, the mathematical optimization for finding the set of paths includes generating an objective function based on the total flow completion time and the at least one additional objective, and finding a minimum of the objective function to obtain the set of paths.

In some embodiments, each of the flows of a coflow is associated with one of the source-destination pairs. The multiple candidate data paths are assigned to the flows. Flow finish time of a given flow is a summation of path completion times for the assigned multiple candidate paths of the given flow. Flow finish times of all of the flows are equal. The total flow completion time equals the flow finish times.

In some embodiments, the path completion time of a given path is a function of a fraction of volume through the given path and bandwidth assigned to the given path. In some embodiments, the bandwidth assigned to a given path is a function of total bandwidth used by all flows using a link.

In some embodiments, bandwidth of the coflow is reduced so flows of the coflow are consumed at its destination at a predicted time. Excess bandwidth is created. In some embodiments, at least one additional coflow is processed, and the excess bandwidth is reapportioned to the at least one additional coflow.

In some embodiments, reducing the bandwidth of the coflow includes proportionately scaling down bandwidth of the flows of the coflow.

According to various embodiments, a computing device, a non-transitory computer readable storage medium, and a method are provided. A first coflow and at least one additional coflow for a plurality of networked computer sites are handled. The first coflow has a plurality of flows. A time at which a slowest flow of the plurality of flows will be ready for scheduling is predicted. Bandwidth of the first coflow is reduced such that each of the plurality of flows will be scheduled at the predicted time.

In some embodiments, excess bandwidth is created by reducing bandwidth. The excess bandwidth is reapportioned to the at least one additional coflow.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 1 is method of processing a coflow to identify data paths for geo-distributed computer sites that communicate via WAN, consistent with an illustrative embodiment.

FIG. 7 is a method of allocating bandwidth among a plurality of coflows, consistent with an illustrative embodiment.

FIG. 8 is an architecture of a coflow engine, consistent with an illustrative embodiment.

FIG. 9 is a functional block diagram of a computer hardware platform that can communicate with various networked components.

DETAILED DESCRIPTION

Overview

Figure 2:
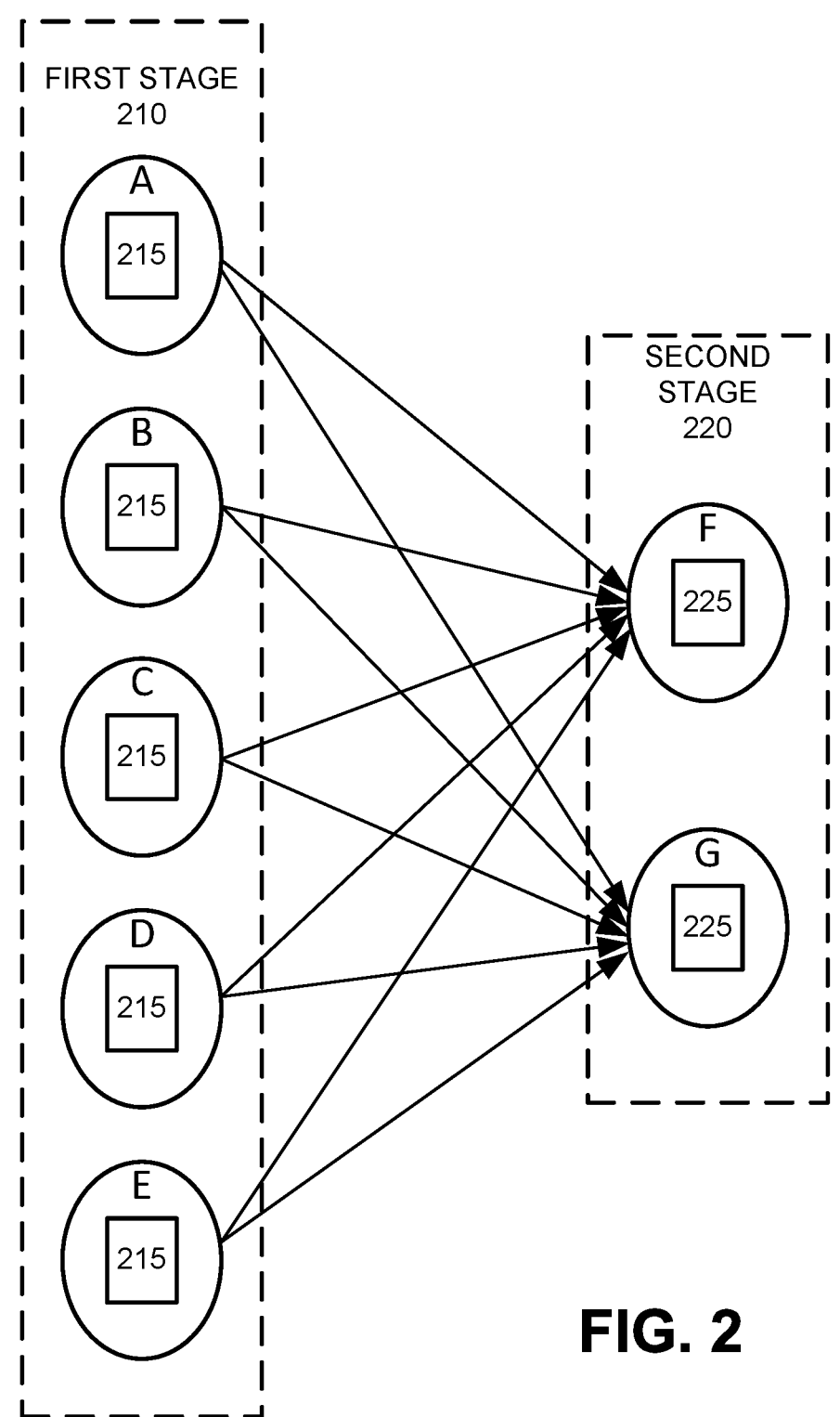
FIGS. 2 and 3 are topologies of geo-distributed computer sites, consistent with illustrative embodiments.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to geo-distributed computer sites that communicate via wide area network (WAN). As used herein, a computer site refers to a site with one or more computers. Multiple computers at a computer site may communicate via a local area network or other network. At a computer site such as a datacenter, a cluster of computers are physically proximal (e.g., in the same room, building or facility) and communicate via a local area network.

Each computer site is responsible for performing one or more tasks. As used herein, a task refers to a unit of execution or a unit of work. A task may be, without limitation, a process, thread, step, request or query.

A WAN may be characterized as computer networking technologies used to transmit data over long distances, and between different networks. The long distances may span region to region, country to country, or even continent to continent. As used herein, geo-located means at least some of the computer sites are long distances apart.

A WAN may include an overlay networking structure. This may include intermediate gateways that are responsible only for routing traffic between computer sites and do not offer compute/storage capabilities.

Connection technologies for implementing a WAN may include, without limitation, asynchronous transfer mode, cable, dial-up, digital subscriber line, fiber optics, frame relay, Integrated Services Digital Network (ISDN), leased line, synchronous optical networking, X.25, and software-defined (SD)-WAN. However, SD-WAN offers certain advantages, which will be discussed below.

An SD-WAN architecture establishes a software-based controller that consolidates and centralizes the unique configuration settings of each underlying WAN, enabling data provisioning, network security protocols, and policy settings to be orchestrated to multiple WAN endpoints and edge devices at the same time. This centralized software layer may be formed by establishing encrypted tunnels ("the overlay") between it and the networks it manages via an SD-WAN device. Each WAN location may be equipped with an SD-WAN device that serves as a communication hub between that physical WAN network and the SD-WAN software layer. This device receives and enforces customed-defined configuration and traffic policies from the centralized SD-WAN layer above it. These physical SD-WAN devices can be managed remotely and are what enable the SD-WAN layer to operate beyond a WAN's physical boundary.

The computer sites may communicate via a single WAN, or they may communicate via multiple WANs. As used herein "communicate via WAN" covers communication via one or more WANs.

A WAN communication protocol includes an application layer and a network layer. For example, the protocol may follow the Open Systems Interconnection (OSI) model. In the OSI reference model, the communications are split into seven different abstraction layers: Physical, Data Link, Network, Transport, Session, Presentation, and Application.

The SD-WAN architecture may also include a centralized coflow-aware scheduler. The coflow-aware scheduler sorts coflows based on their completions times and schedules the coflows.

By virtue of the concepts discussed herein, information that describes flows at the application layer (layer 7) is generated to improve communications between geo-distributed computer sites that communicate via WAN. This information may be provided to the network layer (layer 3).

Counterparting

According to various embodiments of the present disclosure a computer-implemented method is provided. A coflow is mapped to a plurality of geo-distributed computer sites that can communicate via wide area network (WAN), where the mapping is subject to one or more location-dependent constraints. Multiple candidate data paths are identified for each of a plurality of source-destination pairs of the plurality of geo-distributed computer sites. A mathematical optimization is performed to find a set of paths from the candidate data paths based on flow completion time and at least one additional objective of the coflow.

The method extends coflows to a geo-distributed topology of computer sites that communicate via WAN while simultaneously addressing several issues, including, bottlenecks in WAN bandwidth, and compliance with location-dependent restrictions. Total flow completion time is optimized along with at least one other coflow objective.

In some embodiments, which can be combined with the preceding embodiment, the at least one additional objective is job-specific. This enables the mathematical optimization to be tailored to a specific use case or communication pattern.

In some embodiments, which can be combined with the preceding embodiments, the at least one additional objective includes at least one of WAN bandwidth utilization overhead, link usage cost, or egress copy overhead. If different coflows have different objectives, the optimization can account for heterogeneity in coflow objectives.

In some embodiments, which can be combined with the preceding embodiments, a dependency graph structure is accessed. The dependency graph structure describes geo-distributed job objectives and data sources, inter-operator data volumes, and the location-dependent constraints. The at least one additional objective of the coflow is derived from the geo-distributed job objectives. A number of computer sites for a given stage is estimated subject to the one or more location-dependent constraints. The mapping includes placing tasks at the number of computer sites. The dependency graph structure enables context to be leveraged to improve scheduling utilization of precious WAN resources.

In some embodiments, which can be combined with the preceding embodiments, the mapping includes performing a second mathematical optimization of an objective function based on a proportion of tasks, upload bandwidth, download bandwidth, and data volume for each of the number of computer sites. The mapping further includes quantizing each proportion, and scaling each quantized proportion to produce an actual number of tasks at each of the number of computer sites.

In some embodiments, which can be combined with the preceding embodiments, the objective function of the second mathematical optimization is optimized in part with respect to copy time. A reduction in copy time is balanced against the at least one additional objective.

In some embodiments, which can be combined with the preceding embodiments, the mathematical optimization for finding the set of paths includes generating an objective function based on the total flow completion time and the at least one additional objective, and finding a minimum of the objective function to obtain the set of paths. Such an approach enables the set of paths to be found in a computationally efficient manner.

In some embodiments, which can be combined with the preceding embodiments, the coflow includes a plurality of flows. Each of the flows is associated with one of the source-destination pairs. The multiple candidate data paths are assigned to the flows. Flow finish time of a given flow is a summation of path completion times for the assigned multiple candidate paths of the given flow. Flow finish times of all of the flows are equal. The total flow completion time equals the flow finish times.

Packing density of flows is maximized by using multiple paths simultaneously to route a particular flow (within a coflow). Maximizing the packing density may result in significantly lower copy completion times.

In some embodiments, which can be combined with the preceding embodiments, the bandwidth assigned to a given path is a function of total bandwidth used by all flows using a link. The total bandwidth is limited by residual capacity of the link.

In some embodiments, which can be combined with the preceding embodiments, information about the set of paths is sent to a software-driven WAN controller. The software-driven WAN controller can enforce the paths in the set.

In some embodiments, which can be combined with the preceding embodiments, bandwidth of the coflow is reduced so flows of the given coflow are consumed at its destination at a predicted time. As a result, finding the set of paths is sensitive to when copied data outputs will be used at a destination.

In some embodiments, which can be combined with the preceding embodiment, reducing the bandwidth of the coflow includes proportionately scaling down bandwidth of the flows of the coflow. Excess bandwidth is created.

In some embodiments, which can be combined with the preceding embodiments, at least one additional coflow is processed, and the excess bandwidth is reapportioned to the at least one other coflow. This improves overall system bandwidth.

In some embodiments, which can be combined with the preceding embodiments, the coflow is scheduled according to a shortest coflow first policy. This policy enables a job to complete faster.

According to various embodiments of the present disclosure a computing device is provided. The computing device includes a memory having computer readable instructions, and one or more processors for executing the computer readable instructions to configure the computing device to perform the following acts. A coflow is mapped to a plurality of geo-distributed computer sites that can communicate via wide area network (WAN), where the mapping is subject to one or more location-dependent constraints. Multiple candidate data paths are identified for each of a plurality of source-destination pairs of the plurality of geo-distributed computer sites. A mathematical optimization is performed to find a set of paths from the candidate data paths based on total flow completion time and at least one additional objective of the coflow.

In some embodiments of the computing device, which can be combined with the previous embodiment of the computing device, execution of the instructions configures the computing device to perform further acts including reducing bandwidth of the coflow to create excess bandwidth, and reapportioning the excess bandwidth to at least one additional coflow that is being processed by the computing device.

According to various embodiments of the present disclosure, a computer program product includes one or more computer-readable memory devices encoded with data. The data includes instructions that, when executed, causes a processor set to perform a method. The method includes mapping a coflow to a plurality of geo-distributed computer sites that can communicate via wide area network (WAN). The mapping is subject to one or more location-dependent constraints. The method further includes identifying multiple candidate data paths for each of a plurality of source-destination pairs of the plurality of geo-distributed computer sites, and performing a mathematical optimization to find a set of paths from the candidate data paths based on flow completion time and at least one additional objective of the coflow.

According to various embodiments of the present disclosure a computer-implemented method includes handling a first coflow and at least one additional coflow for a plurality of networked computer sites. The first coflow has a plurality of flows. The method further includes predicting a time at which a slowest flow of the plurality of flows will be ready for scheduling, and reducing bandwidth of the first coflow such that each of the plurality of flows will be scheduled at the predicted time.

In some embodiments, which can be combined with the preceding embodiment, the reducing the bandwidth of the first coflow creates excess bandwidth, which is reapportioned to the at least one additional coflow.

Data Path Method and Example Topology

Reference is made to FIG. 1, which illustrates method of processing a coflow to identify data paths for geo-distributed computer sites that communicate via WAN. At block 110, job objectives, tasks for fulfilling the objectives, stages for performing the tasks, and location-dependent constraints are identified. For example, a dependency graph structure may describe job objectives and data sources, inter-operator data volumes, and location-dependent constraints. Coflow objectives may be derived from the job objectives.

At block 120, a coflow is mapped to a plurality of geo-distributed computer sites that can communicate via WAN. The mapping includes identifying computer sites for achieving the job objectives. The mapping also includes placing tasks at each of those identified computer sites. The tasks are structured to take place in successive computation stages, where a computation stage is not finished until all of its flows have completed. Thus, the net progress of a stage is limited by slow straggler flows from a previous stage. The task placement may be performed with the recognition that that here is no advantage in copying some data quickly if other copy operations are delayed.

The mapping is subject to the location-dependent constraints. There might be policy constraints (e.g., sovereignty and data governance policies) associated with what data can be shipped to and routed through certain computer sites. For example, a data governance policy includes a list of countries that are prohibited from receiving certain types of data. The coflow is not mapped to computer sites in any of the listed countries.

Additional reference is made to FIG. 2, which illustrates an example of a network topology produced by block 120. The topology of FIG. 2 indicates that a job will be performed in two successive computation stages: a first stage 210 followed by a second stage 220. Each stage 210 and 220 is said to finish when all of its flows have completed.

A coflow is mapped to computer sites at locations A to G. The computer sites 215 and 225 at locations A-G are geo-distributed and satisfy their location-dependent constraints. The computer sites 215 at locations A-E perform first stage operations in parallel, and computer sites 225 at locations F and G perform second stage operations in parallel.

The topology of FIG. 2 illustrates a coflow having a many-to-many communication pattern. Each computer site 215 in the first stage has a flow (represented by a directed line) to each computer site 225 in the second stage 220.

At block 130, multiple candidate data paths are identified for each of a plurality of source-destination pairs of the computer sites. For the topology of FIG. 2, the source-destination pairs (as designated by location) are AF, BF, CF, DF, EF, AG, BG, CG, DG, and EG. Each candidate data path travels from its source, though one or more intermediary sites and terminates at its destination.

Figure 3:
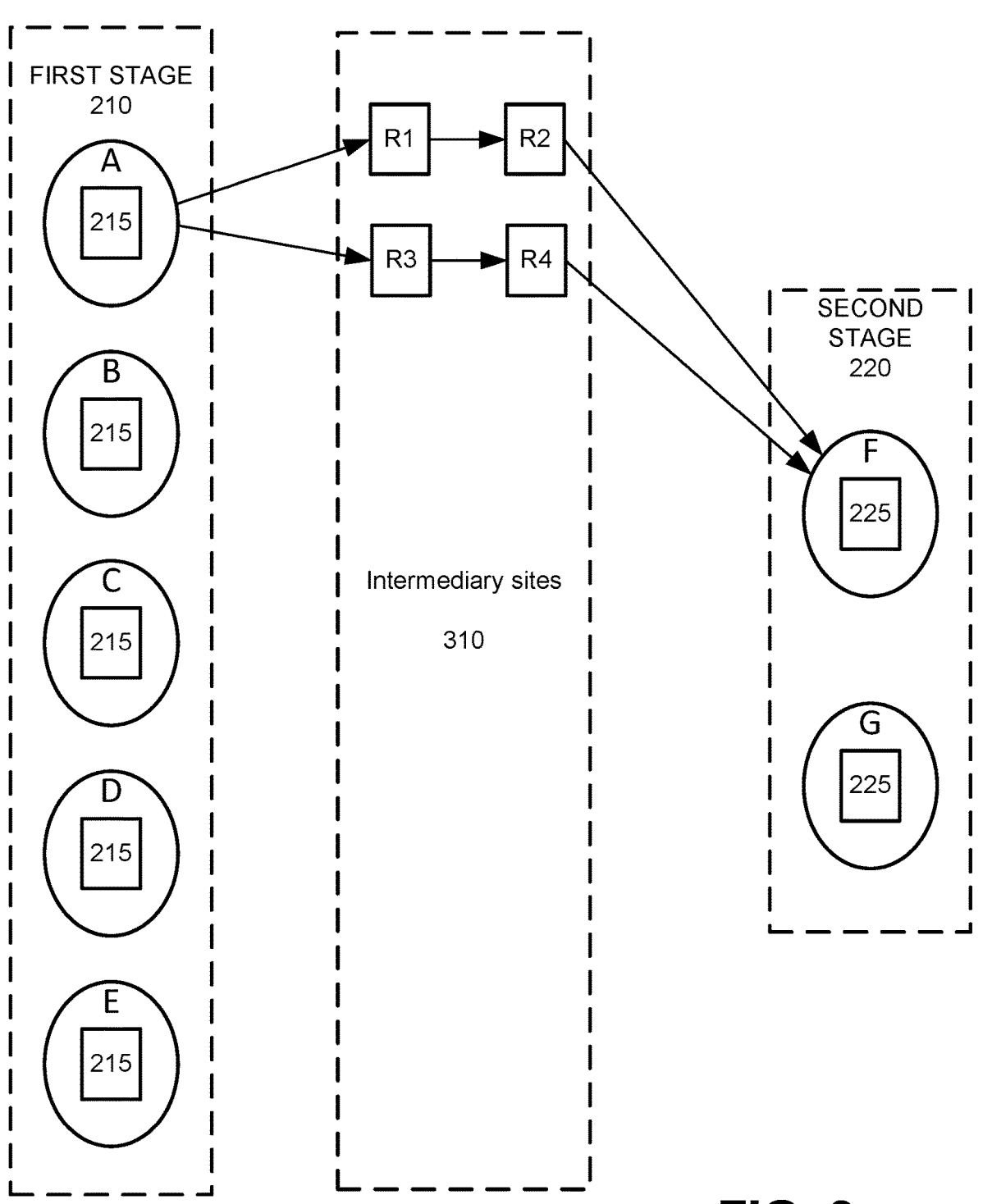

Reference is made to FIG. 3, which illustrates intermediary sites 310 between the first and second stages 210 and 220. The intermediary sites 310 include SD-WAN controlled routers (e.g., R1, R2, R3 and R4) and other SD-WAN data path elements. The intermediary sites 310 enable multiple parallel paths to be considered for the flow between a source and a destination. Thus, the flow between any source-destination pair may leverage multiple parallel paths rather than a single path.

FIG. 3 further illustrates an example of multiple candidate data paths between the source-destination pair AF of FIG. 3. Multiple parallel paths may be routed from the computer site 215 at location A though a set of intermediary sites 310 until the computer site 225 at location F is reached. In this example, router R1, router R2, router R3 and router R4 together form an overlay network. One of the candidate data paths may be A->R1->R2->F. Another one of the candidate data paths may be A->R3->R4->F.

At block 140, a mathematical optimization is performed to find a set of paths from the candidate paths based on total flow completion time and at least one additional coflow objective. For example, an objective function is formulated for total flow completion time and at least one other coflow objective for all of the candidate data paths. A minimum of the objective function yields the set of paths.

Examples of additional objectives of the coflow include, without limitation, at least one of WAN bandwidth utilization overhead, link usage cost or egress copy overhead. Given these examples, the mathematical optimization may be based on total flow completion time and WAN bandwidth utilization overhead; or it may be based on total flow completion time and link usage cost; or it may be based on total flow completion time and egress copy overhead; or it may be based on total flow completion time, WAN bandwidth utilization and link usage cost; or it may be based on total flow completion time. WAN bandwidth utilization and egress copy overhead; or it may be based on total flow completion time, link usage cost, and egress copy overhead; or it may be based on total flow completion time, WAN bandwidth utilization, link usage cost, and egress copy overhead.

The additional objective(s) may be job-specific. This enables the mathematical optimization to be tailored to a specific use case or communication pattern.

At block 150, information about the set of data paths identified at block 140 are sent to an SD-WAN controller. This information helps the SD-WAN controller program route tables and route entries on intermediate SD-WAN data path elements in order to enforce the set of paths that have been found. A scheduling framework that is coflow-aware can coordinate scheduling of flows of a coflow such that they complete together.

The method of FIG. 1 enables a coflow to be extended to geo-distributed computer sites that communicate via WAN. The method simultaneously addresses several issues with respect to coflows in such a computing environment, including bottlenecks in WAN bandwidth, complying with data policy restrictions with respect to a source site and a destination site, and placement of tasks in a coflow-friendly manner (that is, to achieve coflow objectives). The method of FIG. 1 optimizes total flow completion time along with at least other coflow objective.

Moreover, the method of FIG. 1 can increase packing density by using multiple paths simultaneously to route a particular flow. This increase may significantly lower copy completion times.

The method may leverage the context offered by a dependency graph structure to improve scheduling utilization of precious WAN links across multiple geo-distributed jobs.

Specific examples of the mapping and finding the set of paths will now be discussed.

Mapping Example

Figure 4:
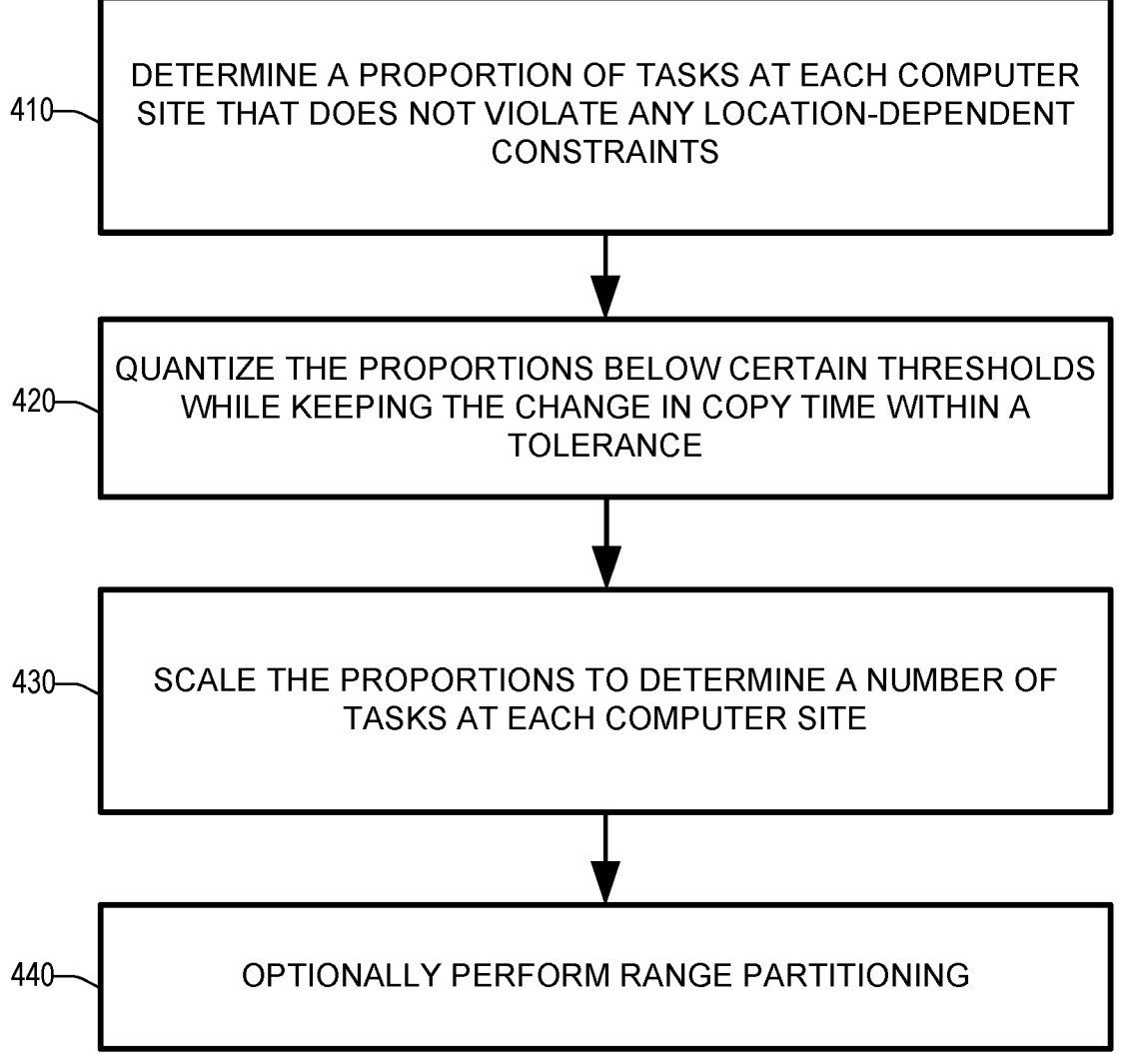
FIG. 4 is a method of mapping a coflow to a plurality of geo-distributed computer sites, consistent with an illustrative embodiment.

Reference is now made to FIG. 4, which illustrates an example of the mapping. At block 410, given a set of computer sites and a data volume at each source, a proportion (that is, a fraction) of tasks at each valid computer site (that is, a computer site that does not violate any location-dependent constraints) is determined, while minimizing copy time. A proportion could be zero for a computer site with no allocated tasks. The proportions may be expressed as fractions or weights.

At block 420, the proportions are quantized below certain thresholds while keeping the change in copy time within a tolerance. The quantizing reduces the number of computer sites in the set. The quantizing may be performed by right-shifting scaled weights (dividing by 2) for each bit position while copy time is still within the tolerance.

At block 430, the quantized proportions are scaled to produce the actual number of tasks at each site. For example, the quantized proportions for computer sites i=1, 2 and 3 are 0.2, 0.3 and 0.4. Scaling these quantized proportions produces 2, 3 and 4 tasks at sites 1, 2 and 3.

For example:

$r_i$ is the fraction of tasks at the $i^{th}$ computer site;

$S = \Sigma_i S_i$, where $S_i$ is the data volume at the $i^{th}$ computer site;

$U_i$ and $D_i$ are the upload and download bandwidths at the $i^{th}$ computer site;

$TU_i(r_i)$ is the time for an upload task to the $i^{th}$ computer site; and $TD_i(r_i)$ is the time for a download task from the $i^{th}$ computer site.

The time for an upload task is computed as $TU_i(r_i)=(1-r_i)S_i/U_i$. This distributes the data $S_i$ across all computer sites except itself subject to the upload bandwidth $U_i$.

The time for a download task is computed as $TD_i(r_i)=r_i * (S-S_i)/D_i$. This distribute content from other sites $(S-S_i)$ to site i subject to its download bandwidth $D_i$.

A mathematical optimization such as integer linear programming (ILP) may be performed in which the objective function and constraints are linear to minimize the coflow completion time T subject to the following:

For sites that do not comply with location-dependent constraints, $r_i=0$.

For all other sites:

$$r_i > 0.$$

$$\sum_i r_i = 1.$$

$$TU_i(r_i) < T.$$

$$TD_i(r_i) < T.$$

The output of the ILP is the proportion of tasks at each computer site. These proportions are then quantized and pruned to a smaller subset of computer sites based on the exact number of reducers picked (e.g., 256).

Optionally at block 440, the quantized proportions may be used to compute data volumes between each source-destination pair. A histogram analysis of the data may be performed to range partition data at each computer site and map the data to appropriate tasks at upstream sites to balance load equally using a bin-packing scheme. Range partitions give better control with respect to achieving equal-sized partitions.

The method of FIG. 4 produces a solution with respect to the number of computer sites and how data is mapped to those sites in a bandwidth-sensitive fashion.

Example of Finding a Set of Data Paths Between Sources and Destinations

Figure 5:
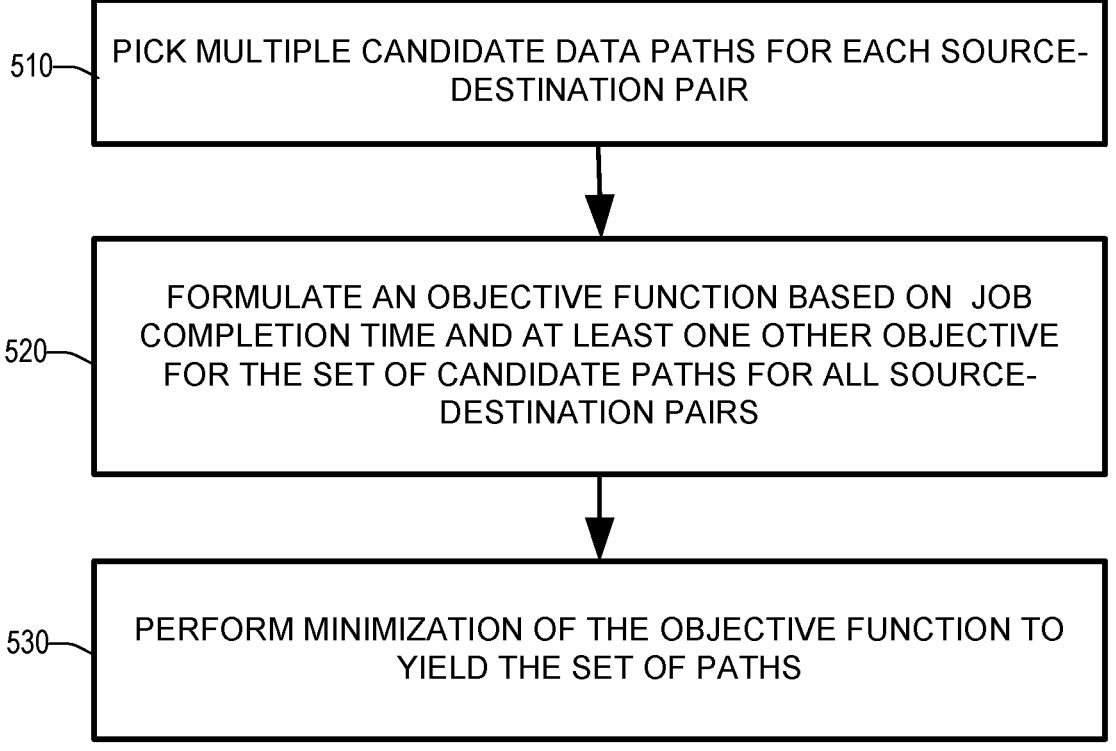
FIG. 5 is a method of determining a set of data paths for a mapped coflow, consistent with an illustrative embodiment

Reference is now made to FIG. 5, which illustrates a method of finding a set of data paths. The set of data paths may be found by a mathematical optimization. At block 510, multiple candidate data paths for each source-destination pair are picked. At block 520, an objective function is formulated for total flow completion time and at least one other objective for the set of candidate paths for all source-destination pairs. At block 530, a minimization of the objective function yields the set of paths.

Consider the $i^{th}$ coflow, which has a flow j and $$x_{ij}^k$$

is the fractional value of the volume $v_{i,j}$ of flow j that passes through path $P_k$. Now consider the following constraints.

Constraint 1:

$$x_{ij}^k$$

has factional value $$x_{ij}^k \in [0, 1] \forall\, j, \forall\, k$$

Constraint 2: The volume of flow j flowing over all paths is equal to its total volume.

$$\sum_k x_{ij}^k = 1 \quad \forall\, j$$

Constraint 3. Total flow completion time of all flows in the $i^{th}$ coflow are equal.

$$\sum_k \frac{x_{ij}^k v_{ij}}{b_{ij}^k} = t_{ij} \text{ and } t_{ij} = t_i \quad \forall\, j$$

Constraint 4. The bandwidth used by all flows using a link is limited by the residual capacity of the link.

$$\sum_j \sum_{k:l \in P_{ij}^k} b_{ij}^k \le R_l \quad \forall\, l$$

Constraint 5: Bandwidth assigned to a flow in a path is proportional to its volume.

$$b_{ij}^k = \sum_k \frac{x_{ij}^k v_{ij}}{\sum_j x_{ij}^k v_{ij}} B_k \quad \forall\, j, \forall\, k$$

Link usage cost of the $i^{th}$ coflow:

$$C_i^L = \sum_l \sum_j \sum_{k:l \in P_{ij}^k} c_l x_{ij}^k v_{ij}$$

Bandwidth utilization cost of the $i^{th}$ coflow:

$$C_i^B = \sum_l \sum_j \frac{b_{ij}^k}{R_i}$$

Objective function:

$$\text{minimize } w_1 t_1 + w_2 C_i^L + w_3 C_i^B$$

The term $B_k$ refers to the bandwidth contribution of the $k^{th}$ path. The term $c_l$ refers to a cost parameter of the $l^{th}$ link. A link refers to a WAN link that has finite capacity, and residual capacity $R_l$ of a WAN link refers to the capacity that remains after bandwidth has been allocated towards coflows.

In this particular example, the set of paths can be found by minimizing the weighted sum of total flow completion time, link usage cost and WAN bandwidth utilization cost. Weights $w_1$, $w_2$ and $w_3$ of the objective function may be tuned depending on aspects of a particular use case.

Method of Processing Multiple Coflows

The method of FIG. 1 describes the processing of a single coflow. In practice, more than one coflow may be processed.

Figure 6:
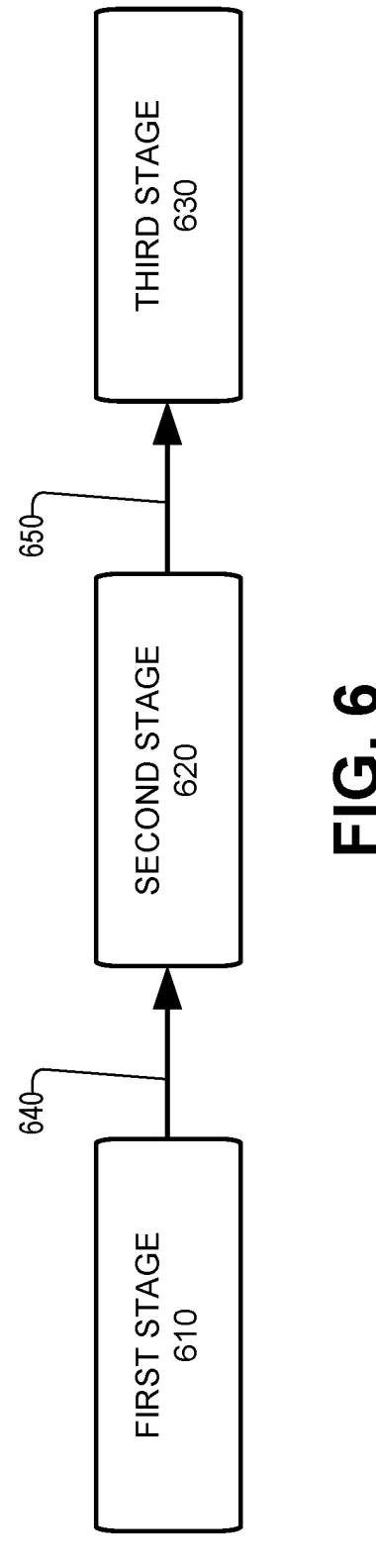
FIG. 6 is an illustration of a multi-stage job and corresponding coflows.

Reference is made to FIG. 6, which illustrates a job that is performed in three successive stages: a first stage 610, a second stage 620 downstream of the first stage 610, and a third stage 630 downstream of the second stage 620. There is a first coflow 640 between the first and second stages 610 and 620, and there is a second coflow 650 between the second and third stages 620 and 630. The method of FIG. 1 may be used to find a set of paths for each coflow 640 and 650.

The method of FIG. 1 is described in connection with a single job. However, a computing environment may perform a plurality of jobs, and there may be one or more coflows corresponding to each of those jobs.

WAN bandwidth is a bottleneck source in geo-distributed analytics. Data transfer is limited by the slowest flow in a coflow. Thus, the net progress of a stage is limited by this slow "straggler" flow. Since data processing in downstream stages will usually not begin until data from all upstream stages (spanning multiple sites) has been received, inefficient WAN scheduling between one pair of sites can delay the entire stage. The method of FIG. 7 processes multiple coflows in a manner that improves WAN scheduling and WAN bandwidth utilization.

Reference is now made to FIG. 7, which relates to the processing of multiple coflows in such an environment. At block 710, coflow entries are stored a queue. A queue refers to a data structure such as a list of data items that are stored so as to be retrieved in a definite order. Each coflow entry may include the following information about a coflow: volume of data at each source (upstream site) and their locations; objective of the coflow (inherited from the objective of the job); and location-dependent constraints associated with each data source.

The coflow entries may be arranged in the queue in priority order. Each coflow entry may also include a priority value indicating priority of the coflow. Priority may be tuned for a variety of settings. As examples, priority may proportional to total flow completion time, it may be derived from the importance of customer who instantiates the job etc. As will be discussed below, prioritization can aid with the improvement in WAN bandwidth utilization.

At block 720, predictions are made of the times at which the tasks at the destination sites will be ready for scheduling. The information for predicting times may be obtained by observing queuing delay in task queues of the task schedulers at the destination sites. Big data jobs are typically deterministic. By knowing the ordering of the tasks and the time they take, it can be determined when a given task in the queue will be ready for scheduling.

At block 730, bandwidth of a coflow is reduced such that each of the plurality of flows will be scheduled at the predicted time. Bandwidth of a coflow may be reduced by proportionately scaling down bandwidth of its flows by a scale factor. For example, if $tn^D$ is the time for xferring data D and $tc^D$ additional time when the task consuming D, the bandwidth of the flow is scaled by $tn^D/tc^D+tn^D$. As a result, excess bandwidth is created.

At block 740, the excess bandwidth is reapportioned to at least one other coflow having an entry the queue. The reapportionment may be a function of coflow priority, where higher priority coflows may receive the saved bandwidth before lower priority coflows. For example, during each epoch (for example a defined interval of 5 minutes), all enqueued coflow requests are walked through iteratively and arranged one by one in priority order. Available bandwidth and site resource availability are adjusted to account for decisions made, and the next coflow entry is processed. This process continues until either the queue is drained or there are no resources (WAN bandwidth) available to schedule additional coflow requests.

At block 750, coflow information and priorities of the coflows are sent to an SD-WAN controller or a centralized coflow-aware scheduler. The centralized flow-aware scheduler dictates priorities and these priorities are enforced by the SD-WAN data path element.

The coflows may be scheduled according to a shortest coflow first policy. Each site exchanges periodic information to the centralized coflow-aware scheduler, which instructs each site of the priority of each coflow. Each source then schedules any flows pertaining to that coflow according to the priority.

The method of FIG. 7 is sensitive to when copied data will be consumed by a task at the destination. It performs resource-aware monitoring that is able to predict when data will be consumed at the destination. Bandwidth of a coflow is reduced, and excess is then reapportioned amongst other coflows, thereby optimizing over-all bandwidth.

The method of FIG. 7 is not limited to a geo-distribution of computer sites, location-dependent constraints, or multiple paths between source-destination pairs. The method of FIG. 7 is not limited to coflows processed according to the method of FIG. 1. The method of FIG. 7 may be applied to geo-distributed coflows, or coflows at a single computer site (e.g., a datacenter), or both.

Examples of Use Cases

A method herein is not limited to any particular use case. The following use cases are offered as examples. As a first example, a method herein may be used for pre-training input data present in multiple datacenters. This first example is driven by a desire to collocate computing close to data and the location of training data sets.

As a second example, a method herein may be used for local analytics by computer sites at spokes followed by aggregation by computer sites at a hub. This second example is driven by large volumes and data sovereignty considerations.

As a third example, a method herein may be used for data integration such as extract, transform and load (ETL), which combines data from multiple data sources into a single, consistent data store that is loaded into data warehouses. This third example is driven by a desire to centralize data generated by multiple sites in centralized enterprise data warehouses for unified Business Intelligence querying As a fourth example, a method herein may transparently use capabilities of multiple clouds for analytics. This fourth example is driven by cost and unique capabilities offered by different cloud providers.

Example Architecture for a Coflow Engine

Reference is now made to FIG. 8, which illustrates an example architecture of a coflow engine 800. The coflow engine 800 includes a DAG module 810 that is configured to receive a directed acyclic graph (DAG). The DAG may be a physical DAG, or it may be a functional DAG (FDAG), which specifies data-transforms and dataflow structures associated with one or more geo-distributed jobs. The FDAG may also specify data locations, the objectives and location-dependent constraints. If the DAG module 810 receives an FDAG, it expands the FDAG into a physical DAG, where each data transform is mapped to a site.

The coflow engine 800 further includes a query planner 820 that is configured to estimate the number of computer sites for a given stage. The estimate may be made via selectivity analysis based on the data distribution of the intermediate data input. If a histogram is generated and balancing is performed during mapping, the query planner 820 may also perform allocation of range-partitions of keys to each task.

The coflow engine 800 further includes a coflow placer 830. The coflow placer 830 includes an input module 832, a mapper module 834, and a path selector module 836. The input module 832 is configured to receive information about job objectives, tasks, stages, coflow objectives, location-dependent constraints, available site resource capability (e.g., upload and download bandwidths), and an estimate of computer sites per stage. The input module 832 is also configured to create a queue of coflow requests.

The mapper module 834 is configured to map each coflow, subject to location-dependent constraints, to a plurality of geo-distributed computer sites that communicate via WAN (see block 120 of FIG. 1). The mapper module 834 is also configured to send task mappings to the mapped computer sites.

The path selector module 836 is configured to identify, for each coflow, multiple candidate data paths and a plurality of source-destination pairs (see block 130 of FIG. 1). The path selector module 836 is also configured to select a set of paths for each source-destination pair (see block 140 of FIG. 1).

The coflow placer 830 may also include a reapportioner module 838 that is configured to reduce coflow bandwidth and reapportion saved bandwidth among other coflows having enqueued entries (see blocks 710-750 of FIG. 7). The reapportioner module 838 has a view into task schedules of other computer sites.

The coflow placer 830 sends coflow information, including priorities and data path information, to an SD-WAN controller.

Example Particularly Configured Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 9, computing environment 900 includes an example of an environment for the execution of at least some of the computer code involved in performing the inventive methods, including a block 950. In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 950 typically includes at least some of the computer code involved in performing the inventive methods. In some embodiments, the block 950 may include the coflow engine 800 of FIG. 8. In other embodiments, the block 950 may include code for performing the method of FIG. 1 or portions thereof. In still other embodiments, the block 950 may include code for performing the method of FIG. 7 or portions thereof.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer

901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:
accessing a dependency graph structure that describes geo-distributed job objectives and data sources of a coflow, inter-task data volumes of the coflow, and one or more location-dependent constraints of the coflow;
determining, for a stage of a plurality of successive computational stages, a plurality of geo-distributed computer sites based on the one or more location-dependent constraints;
mapping the coflow to the plurality of geo-distributed computer sites, wherein
the plurality of geo-distributed computer sites communicates via wide area network (WAN),
the mapping is based on the one or more location-dependent constraints, and
the mapping includes placing a plurality of tasks at the plurality of geo-distributed computer sites;
identifying multiple candidate data paths for each of a plurality of source-destination pairs of the plurality of geo-distributed computer sites; and
performing a first mathematical optimization to identify a set of paths from the multiple candidate data paths, wherein
the identifying of the set of paths is based on a total flow completion time of the coflow and at least one additional objective of the coflow, and
the at least one additional objective of the coflow is derived from the geo-distributed job objectives.

2. The computer-implemented method of claim 1, wherein the at least one additional objective is job-specific.

3. The computer-implemented method of claim 1, wherein the at least one additional objective includes at least one of WAN bandwidth utilization overhead, link usage cost, or egress copy overhead.

4. The computer-implemented method of claim 1, wherein the mapping comprises:
performing a second mathematical optimization of an objective function based on a proportion of tasks of the plurality of tasks, upload bandwidth, download bandwidth, and data volume for each of the the plurality of geo-distributed computer sites;
quantizing each proportion of the plurality of tasks; and
scaling each quantized proportion of the plurality of tasks to produce an actual number of tasks at each of the plurality of geo-distributed computer sites.

5. The computer-implemented method of claim 4, wherein the objective function of the second mathematical optimization is optimized in part with respect to copy time.

6. The computer-implemented method of claim 1, wherein the first mathematical optimization comprises:
generating an objective function based on the total flow completion time and the at least one additional objective; and
finding a minimum of the objective function to obtain the set of paths.

7. The computer-implemented method of claim 6, wherein:
the coflow includes a plurality of flows,
each flow of the plurality of flows is associated with one of the plurality of source-destination pairs, and
the multiple candidate data paths are assigned to each flow of the plurality of flows;

flow finish time of a given flow, of the plurality of flows, is a summation of path completion times for the assigned multiple candidate data paths of the given flow;

flow finish times of the plurality of flows are equal; and the total flow completion time equals the flow finish times.

8. The computer-implemented method of claim 7, wherein a path completion time of a given path of the multiple candidate data paths is a function of a fraction of volume through the given path and bandwidth assigned to the given path.

9. The computer-implemented method of claim 8, wherein:

the bandwidth assigned to the given path is a function of total bandwidth used by the plurality of flows using a link; and the total bandwidth is limited by residual capacity of the link.

10. The computer-implemented method of claim 1, further comprising sending information about the set of paths to a software-driven WAN controller.

11. The computer-implemented method of claim 1, further comprising reducing bandwidth of the coflow, wherein a plurality of flows of the coflow are consumed at its destination at a predicted time based on the reducing of the bandwidth, and excess bandwidth is created based on the reducing of the bandwidth.

12. The computer-implemented method of claim 11 wherein the reducing of the bandwidth of the coflow comprises proportionately scaling down bandwidth of the plurality of flows of the coflow.

13. The computer-implemented method of claim 11, further comprising:

processing at least one additional coflow; and reapportioning the excess bandwidth to the at least one additional coflow.

14. The computer-implemented method of claim 1, further comprising scheduling the coflow based on a shortest coflow first policy.

15. A computing device comprising a memory having computer readable instructions, and one or more processors for executing the computer readable instructions to configure the computing device to perform operations comprising:

accessing a dependency graph structure that describes geo-distributed job objectives and data sources of a coflow, inter-task data volumes of the coflow, and one or more location-dependent constraints of the coflow;

determining, for a stage of a plurality of successive computational stages, a plurality of geo-distributed computer sites based on the one or more location-dependent constraints;

mapping the coflow to the plurality of geo-distributed computer sites, wherein the plurality of geo-distributed computer sites communicates via wide area network (WAN), the mapping is based on the to one or more location-dependent constraints, and the mapping includes placing a plurality of tasks at the plurality of geo-distributed computer sites;

identifying multiple candidate data paths for each of a plurality of source-destination pairs of the plurality of geo-distributed computer sites; and performing a mathematical optimization to identify a set of paths from the multiple candidate data paths, wherein the identifying of the set of paths is based on a total flow completion time of the coflow and at least one additional objective of the coflow, and the at least one additional objective of the coflow is derived from the geo-distributed job objectives.

16. The computing device of claim 15, wherein the execution of the computer readable instructions configures the computing device to perform the operations further comprising:

processing at least one additional coflow;

reducing bandwidth of the coflow to create excess bandwidth; and reapportioning the excess bandwidth to the at least one additional coflow, wherein the at least one additional coflow is processed by the computing device.

17. A computer program product comprising one or more computer-readable memory devices encoded with data including instructions that, when executed, causes a processor set to perform a method, comprising:

accessing a dependency graph structure that describes geo-distributed job objectives and data sources of a coflow, inter-task data volumes of the coflow, and one or more location-dependent constraints of the coflow;

determining, for a stage of a plurality of successive computational stages, a plurality of geo-distributed computer sites based on the one or more location-dependent constraints:

mapping the coflow to the plurality of geo-distributed computer sites, wherein the plurality of geo-distributed computer sites communicates via wide area network (WAN), the mapping is based on one or more location-dependent constraints, and the mapping includes placing a plurality of tasks at the plurality of geo-distributed computer sites;

identifying multiple candidate data paths for each of a plurality of source-destination pairs of the plurality of geo-distributed computer sites; and performing a mathematical optimization to identify a set of paths from the multiple candidate data paths, wherein the identifying of the set of paths is based on a total flow completion time of the coflow and at least one additional objective of the coflow, and the at least one additional objective of the coflow is derived from the geo-distributed job objectives.

* * * * *